July 8, 1924.
T. COSGROVE, JR., ET AL
TIRE CARRIER AND RIM REMOVER
Filed April 17, 1922
1,500,371
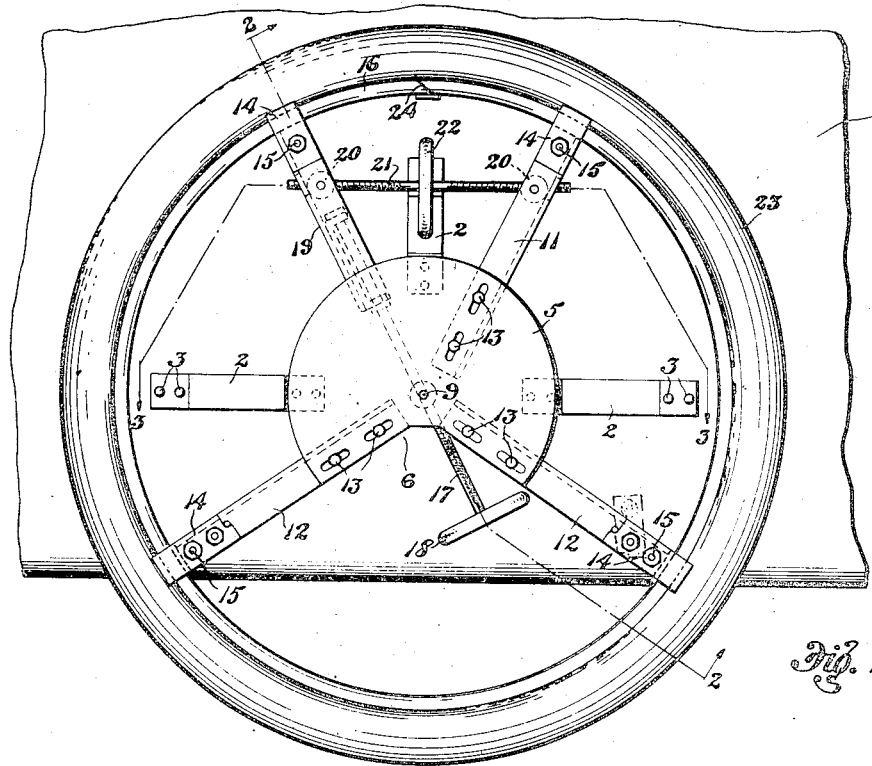
Fig. 1
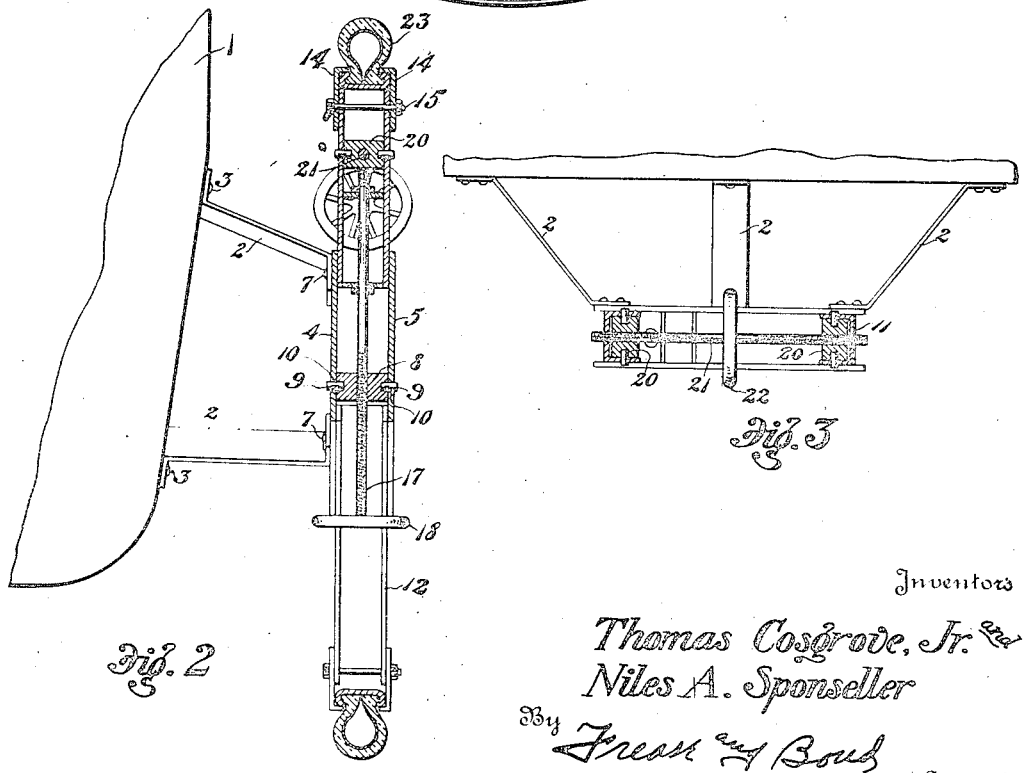
Fig. 2
Fig. 3
Inventors
Thomas Cosgrove, Jr. and
Niles A. Sponseller
By Frease and Bond
Attorneys Patented July 8, 1924.

1,500,371

UNITED STATES PATENT OFFICE.

THOMAS COSGROVE, JR., AND NILES A. SPONSELLER, OF CANTON, OHIO.

TIRE CARRIER AND RIM REMOVER.

Application filed April 17, 1922. Serial No. 554,174.

*To all whom it may concern:*

Be it known that we, THOMAS COSGROVE, Jr., and NILES A. SPONSELLER, both citizens of the United States, and both residing at Canton, in the county of Stark and State of Ohio, have invented a new and useful Tire Carrier and Rim Remover, of which the following is a specification.

This invention relates to a combined tire carrier and rim remover and more particularly to a device arranged to be mounted upon the automobile body to carry a spare tire and rim, and provided with means for expanding and contracting tire rims.

The objects of the invention are to provide a tire carrying device arranged to be permanently mounted upon an automobile body to carry a spare tire and rim, expanding and contracting means being provided upon the device for removing a rim from a tire or replacing the rim within the tire.

The above and other objects may be attained by constructing the device as illustrated in the accompanying drawings, in which—

Figure 1 is an elevation of a tire carrier and rim remover embodying the invention, showing the same mounted upon the rear of an automobile body, a spare rim and tire being shown in position upon the same;

Fig. 2, a section on the line 2—2, Fig. 1; and

Fig. 3, a section on the line 3—3, Fig. 1.

Similar numerals refer to similar parts throughout the drawing.

The rear portion of an automobile body is indicated at 1 and the brackets 2 which support the device are connected thereto as by the rivets 3. The tire carrier and rim remover to which the invention pertains, includes a pair of spaced plates 4 and 5, each of which is preferably circular, having a segment upon the lower side cut out as shown at 6.

The rear plate 4 is connected rigidly to the brackets 2 by rivets or the like 7, the front plate 5 being spaced therefrom by the screw bearing 8 which is journaled between the plates, the pintles 9 upon the opposite ends thereof being rotatably mounted in apertures 10 formed in the plates 4 and 5.

The radially disposed channel arms 11 and 12—12 extend inwardly between the plates 4 and 5, being rigidly connected thereto as by the rivets 13. Jaws 14 are carried at the upper extremities of the arms 11 and 12, being connected thereto by the bolts 15 and are arranged to be normally clamped over opposite edges of the tire rim as shown at 16.

A screw 17 is located through the screw bearing 8 provided with a hand wheel 18 at its lower end, the upper end thereof being swivelly connected to the arm 19 which is loosely mounted between the plates 4 and 5 and provided at its upper end with jaws 14 connected thereto by a bolt 15 similar to the arms 11 and 12.

Screw bearings 20 are rotatably mounted in the arms 19 and 11, a right and left hand screw 21 being located through said bearings and arranged to be operated by the hand wheel 22 intermediate its extremities, for the purpose of drawing the arm 19 toward the arm 11 or moving the same in the opposite direction, depending upon the direction of movement of the hand wheel. A spare rim 16 and tire 23 may thus be carried upon the device as illustrated in Figs. 1 and 2 and it will be seen that the same may be easily removed in the case of emergency.

In the event the device is to be used as a rim remover, the tire and rim will be mounted upon the device as shown in Fig. 1, and the jaws upon the arms 12 moved to the position shown in dotted lines in Fig. 1, and the hand wheel 18 operated to draw the arm 19 radially downward, breaking the joint 24.

The hand wheel 22 is then operated in a direction to draw the arm 19 toward the arm 11, pulling the adjacent end portion of the rim out of engagement with the tire, as the rim is contracted, thus permitting the tire to be easily slipped off of the rack.

In replacing the rim within the tire, the movement of the hand wheel 22 is reversed, expanding the rim into the tire after which the hand wheel 18 is operated to move the arm 19 radially outward, closing the joint 24 in the rim.

From the above description and accompanying drawings, it will be evident that a combined tire carrier and rim remover are provided which will carry a spare tire and rim in position to be quickly used in case of emergency, while at the same time, a stationary rim tool is provided upon the automobile body in an easily accessible position and by means of which a rim may be easily removed or replaced within a tire.

We claim:—

1. A rim remover including a plate, fixed radial arms thereon, a swiveled bearing upon the plate, a screw located through the bearing, an arm carried by the screw, means upon all of the arms for engaging a tire rim and means for oscillating the last named arm.

2. A rim remover including a plate, fixed radial arms thereon, a swiveled bearing upon the plate, a screw located through the bearing, an arm carried by the screw, means upon all of the arms for engaging a tire rim, and a screw for oscillating the last named arm.

3. A rim remover including a plate, fixed radial arms thereon, a swiveled bearing upon the plate, a screw located through the bearing, an arm carried by the screw, means upon all of the arms for engaging a tire rim, and a screw connecting the last named arm with one of the fixed arms for oscillating the movable arm.

THOMAS COSGROVE, Jr.
NILES A. SPONSELLER.